United States Patent [19]

Justice

[11] Patent Number: 4,463,286
[45] Date of Patent: Jul. 31, 1984

[54] LIGHTWEIGHT ELECTRONIC BALLAST FOR FLUORESCENT LAMPS

[75] Inventor: James W. H. Justice, Murrysville, Pa.

[73] Assignee: North American Philips Lighting Corporation, New York, N.Y.

[21] Appl. No.: 294,953

[22] Filed: Aug. 21, 1981

Related U.S. Application Data

[63] Continuation-in-part of Ser. No. 231,523, Feb. 4, 1981, abandoned.

[51] Int. Cl.³ .............................................. H05B 41/29
[52] U.S. Cl. .................................... 315/219; 315/105; 315/223; 315/239; 315/240; 315/244; 315/DIG. 4; 315/DIG. 7
[58] Field of Search ....................... 315/53, 57, 58, 62, 315/206, 208, 209 R, 219, 227 R, 239, 240, 244, DIG. 4, DIG. 7, 105, DIG. 5, 223

[56] References Cited

U.S. PATENT DOCUMENTS

| | | | |
|---|---|---|---|
| 3,371,244 | 2/1968 | Boland | 315/219 |
| 3,579,026 | 5/1971 | Paget | 315/99 |
| 3,593,060 | 7/1971 | Kryder | 315/219 |
| 3,781,594 | 12/1973 | Roberts | 315/105 X |
| 4,327,308 | 4/1982 | Hwang et al. | 315/105 X |

FOREIGN PATENT DOCUMENTS

| | | | |
|---|---|---|---|
| 1200435 | 9/1965 | Fed. Rep. of Germany | 315/DIG. 4 |
| 0178419 | 1/1966 | U.S.S.R. | 315/DIG. 7 |

OTHER PUBLICATIONS

Haver, *Solid-State Fluorescent Ballasts are Here*, EDN, Nov. 6, 1976, vol. 21, No. 20, pp. 65–69.

*Primary Examiner*—Eugene R. Laroche
*Attorney, Agent, or Firm*—Robert T. Mayer; Bernard Franzblau

[57] ABSTRACT

A lightweight, transistorized, inverter circuit is particularly adapted for starting and operating a screw-in compact fluorescent lamp intended for incandescent lamp replacement. Household-type AC is converted to DC with one terminal connected to the center tap of a transformer primary through a choke which constitutes a high impedance at the operating frequency. A tuned circuit capacitor is connected across the transformer primary and a current-limiting capacitor and the lamp to be operated are connected in series across the transformer primary. A pair of transistors are connected in push-pull arrangement between the end portions of the transformer primary and the other terminal of the DC source, with the base electrodes of the transistors connected to the transformer secondary winding so that the push-pull connected transistors oscillate at the tuned circuit resonant frequency which is determined by the inductance of the transformer primary winding and the total capacitance of the connected capacitor means. A potential is applied to the midpoint of the transformer secondary upon energization of the apparatus in order to initiate transistor conduction. The system operates with a high efficacy for the production of light.

7 Claims, 12 Drawing Figures

LIGHTWEIGHT ELECTRONIC BALLAST FOR FLUORESCENT LAMPS

This application is a continuation-in-part of application Ser. No. 231,523 filed Feb. 4, 1981 by the present inventor and owned by the present assignee, now abandoned.

CROSS-REFERENCE TO COPENDING APPLICATION

In copending application Ser. No. 011,832 filed Feb. 13, 1979 by Skwirut et al, now U.S. Pat. No. 4,300,073, and owned by the present assignee, there is disclosed various construction details and different embodiments for a so-called multiple-folded fluorescent lamp which is intended for application as an incandescent lamp replacement. The lamps are disclosed in this copending application are particularly adapted to be operated with an inductive reactor type ballast.

BACKGROUND OF THE INVENTION

This invention relates to a starting and operating apparatus for a fluorescent lamp and, more particularly, to a transistorized inverter apparatus for starting and operating a compact fluorescent lamp.

Transistorized inverter circuits for operating fluorescent lamps from a DC power supply are well known, a typical circuit being disclosed in U.S. Pat. No. 3,593,060, dated July 13, 1971. Such circuits normally operate the lamps at a relatively high frequency above the audible range which enhances the efficiency of operation. In addition, such circuits can be made relatively light as compared to the more usual inductive reactor ballast.

U.S. Pat. No. 3,579,026 dated May 13, 1971 to Paget discloses a transistorized inverter ballast in which a capacitor and transformer provide a tank circuit for the oscillations of the inverter.

In U.S. Pat. No. 3,371,244 dated Feb. 27, 1968 is disclosed a transistorized inverter circuit for operating a discharge device in which a parallelling capacitor is connected across the output winding of the inverter with an additional capacitor in series with the lamp. The parallelling capacitor is started to serve the purpose of reducing spike voltages reflected across the transistors and the series capacitor is described as included in order to improve the power factor of the circuit.

SUMMARY OF THE INVENTION

There is provided a starting and operating apparatus for a fluorescent lamp having a sealed, elongated, light-transmitting envelope with electrodes operatively positioned therein proximate the ends thereof and enclosing a discharge-sustaining filling and having phosphor means coated on the envelope interior surface. The apparatus comprises:

Apparatus input terminals are adapted to be connected across a household-type source of AC energizing potential and apparatus output terminals are provided across which the lamp to be operated is adapted to be connected in cirucit.

An AC to DC conversion means is operable to convert the available AC potential to a predetermined DC potential which is developed across the output terminals of the conversion means.

A transformer means has a primary winding of predetermined inductance and a secondary winding, and the midpoint of the transformer primary is connected via a high impedance choke to one output terminal of the AC to DC conversion means. A tuned resonant circuit capacitor of predetermined capacitance is connected across the transformer primary winding to form therewith a first resonant tuned circuit when the lamp is connected in circuit but is not operating. A current-limiting capacitor means is connected in series with the lamp as connected in circuit and the series-connected current-limiting capacitor means and the series-connected lamp are connected in parallel with the transformer means primary winding. When an operating lamp is connected across the apparatus output terminals, the current-limiting capacitor means and the tuned circuit capacitor means form with the transformer primary winding a second tuned circuit.

A pair of transistors are connected in push-pull arrangement between the ends of the transformer primary winding and the other output terminal of the AC to DC conversion means. The base members of the transistors connect across the transformer secondary winding so that the push-pull connected transistors oscillate at the tuned circuit resonant frequency as determined by the inductance of the transformer primary and the total capacitance of the connected capacitors. There is also provided means for applying a potential from said one output terminal of said conversion means to a center tap of the transformer secondary winding in order to initiate transistor conduction when the apparatus is initially energized.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
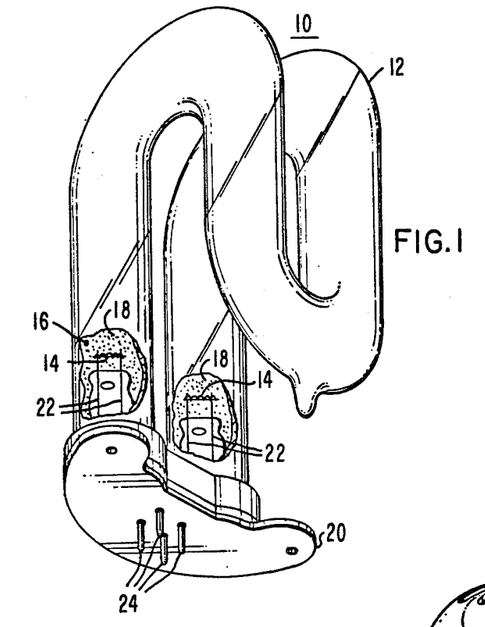
FIG. 1 is an isometric view, shown partly in section, of a folded-envelope, compact fluorescent lamp.

The specific lamp 10 as shown in FIG. 1 forms no part of the present invention; however, the present apparatus is particularly adapted to operate such a lamp. The lamp 10 comprises an elongated light-transmitting envelope 12 with electrodes 14 operatively positioned within the envelope 12 proximate the ends thereof and enclosing a discharge-sustaining filling such as a small charge of mercury 16. A layer of phosphor means 18 is coated onto the interior surface of the envelope 12. A base member 20 is affixed to the ends of the envelope 12 and the electrodes 14 connect via lead-in members 22 to base pins 24.

Considering the lamp 10 in greater detail, the envelope 12 is provided with a double-folded configuration with the overall "unfolded" length of the envelope 12 being approximately 16 inches (40.6 cm). The envelope outer diameter is approximately 0.75 inch (1.9 cm) and the envelope contains a small charge of inert, ionizable starting gas, such as a few torr of argon. For the lamp loadings which are utilized, as will be explained hereinafter, the phosphor layer 18 preferably comprises a three component blend of rare-earth activated materials such as disclosed in U.S. Pat. No. 3,937,998, dated Feb. 10, 1976 to Verstegen et al. Other conventional phosphors may be substituted therefor. In its preferred form, the phosphor blend is provided with a warm-white source color (approximately 3,000° K.) so that it appears generally similar to the incandescent lamp which it is intended to replace.

Figure 2:
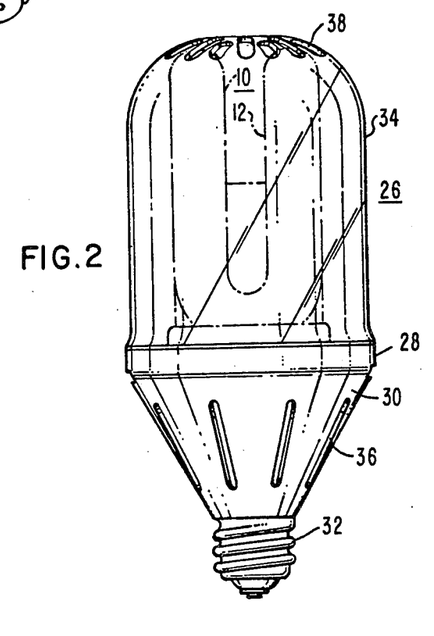
FIG. 2 is an elevational view of an operating lamp unit which incorporates the lamp as shown in FIG. 1 and which is intended to be utilized as an incandescent lamp replacement.

A lamp unit 26 is shown in FIG. 2 wherein the lamp 10 is mounted on a platform member 28 which has affixed thereto a decorative type housing 30 which terminates in a conventional incandescent-type base 32. The folded lamp 10 is preferably partially enclosed within a transparent or translucent casing 34 in order to provide protection and for purposes of appearance. Ventilating slots 36 are provided in the housing member 30 and additional slots 38 are provided in the top portion of casing 34. The apparatus of the present invention is contained within the housing 30 and is preferably mounted on the bottom portion of platform 28. The lamp 10 can either be permanently affixed to the platform 28 or it can be made with a plug-in design, such as shown in FIG. 1, in order that the electronic ballast apparatus can be used with a replacement lamp.

Figure 3:
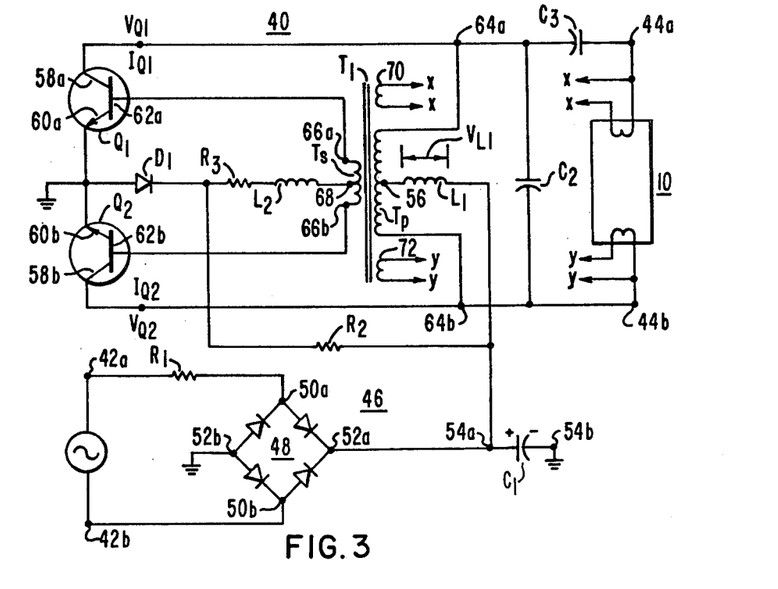
FIG. 3 is a circuit diagram of one embodiment of the present transistorized inverter apparatus.

One embodiment of the electronic starting and operating apparatus of the present invention is shown schematically in FIG. 3. The apparatus 40 comprises a pair of input terminals 42a, 42b adapted to be connected across a household-type source of AC energizing potential (120 V AC, 60 Hz), and a pair of apparatus output terminals 44a, 44b across which the lamp 10 to be operated is adapted to be connected.

An AC to DC conversion apparatus 46 preferably comprises a full-wave rectifier bridge 48 having rectifier input terminals 50a, 50b and rectifier output terminals 52a, 52b. Current limiting impedance means $R_1$ is included in circuit with the rectifier bridge 48 in order to limit the current therethrough. A storage capacitor $C_1$ has one terminal 54a connected to the positive output terminal 52a of the rectifier bridge 48 and the other terminal 54b connects through chassis ground to the other output terminal 52b of the rectifier bridge 48.

A transformer means $T_1$ has a primary winding $T_p$ of predetermined inductance and a secondary winding $T_s$. The transformer primary winding $T_p$ is connected at its midpoint 56 to the more positive output terminal 54a of the storage capacitor $C_1$ via a choke $L_1$ which constitutes a high impedance at the operating frequencies of the circuit. A tuned circuit capacitor $C_2$ of predetermined capacitance connects across the transformer primary winding $T_p$. A current limiting capacitor $C_3$ of predetermined capacitance and the apparatus output terminals 44a, 44b are connected in series, with the series-connected current limiting capacitor $C_3$ and the apparatus output terminals 44a, 44b connected in parallel with the tuned circuit capacitor $C_2$.

A pair of separate transistor means $Q_1$, $Q_2$ each has a collector 58a, 58b and emitter 60a, 60b and a base 62a, 62b. The collectors 58a, 58b of the transistors are respectively connected to opposite ends 64a, 64b of the transformer primary winding $T_p$. The respective emitters 60a, 60b of the transistors connect to the less positive terminal 54b of the storage capacitor $C_1$ via a common electrical point, i.e., chassis ground. The bases 62a, 62b of the transistors respectively connect to the ends 66a, 66b of the transformer secondary winding $T_s$.

The transformer secondary winding $T_s$ is connected at its midpoint 68 with the common electrical point, i.e., chassis ground, in series with means for blocking direct current flow toward the common electrical point, which in this case is a blocking diode $D_1$. The midpoint terminal 68 of transformer secondary $T_s$ connects to the more positive terminal 54a of the storage capacitor means $C_1$ through a resistor $R_2$ in order to provide a positive potential to initiate transistor conduction upon energization of the apparatus 40.

To complete the description of the apparatus, a resistor $R_3$ and inductor $L_2$ of predetermined values are connected in series between the cathode of the blocking diode $D_1$ and the midpoint connection 68 of the transformer secondary winding $T_s$ in order to optimize the switching current delivered to the bases of the transistors $Q_1$, $Q_2$.

In its preferred form, the lamp 10 has a pair of lead-in members 22 sealed through each end thereof and connecting to the respective lamp electrodes 14 (see FIG. 1). In the usual operation of such lamps, a small electrode preheating current is applied therethrough prior to the low pressure discharge being initiated between the respective electrodes. This preheat current is provided by preheating coils 70 and 72 provided on the core of transformer $T_1$ with the respective connections between the heater coils and electrodes shown as x—x, and y—y.

In the operation of the apparatus, upon initial energization, the rectifier 48 charges storage capacitor $C_1$ to the peak value of the AC voltage input and for a 120 V AC supply, this will be approximately 170 V DC. The transistors $Q_1$ and $Q_2$ are put into a conducting mode via the common base resistor $R_2$. The tuned circuit across which the collectors 58a, 58b are connected consists of the transformer primary $T_p$ and tuned circuit capacitor $C_2$ and this tuned circuit is coupled to the transistor base circuits via the secondary $T_s$ of transformer $T_1$ to provide positive feedback. The loop gain of the circuit is sufficient to cause self-sustaining oscillations to occur.

Figure 4:
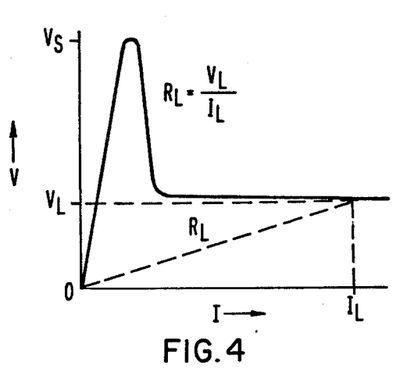
FIG. 4 is a graph of voltage versus current showing typical lamp starting and operating characteristics.

Initially the lamp 10 essentially acts as an open circuit element so that oscillations occur at a frequency determined by the inductance of the transformer primary ($L_p$) and the capacitance of $C_2$. The voltage developed across $T_1$ is approximately 377 V rms and almost all of this voltage is applied across the lamp 10. This causes the lamp to strike and operation of same is initiated. The lamp operating characteristics are shown in FIG. 4 wherein the striking voltage $V_S$ and the lamp operating voltage $V_L$ are plotted on the ordinate and the lamp current $I_L$ is plotted on the abscissa.

Figure 5:
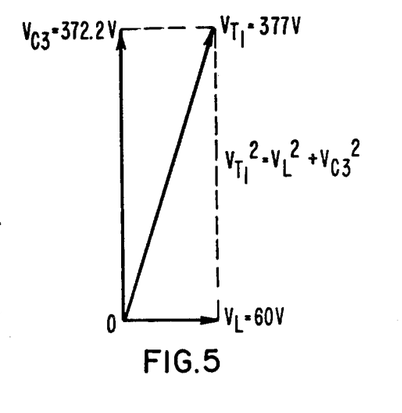
FIG. 5 is a vector diagram of the voltages across the current limiting capacitor, the transformer primary, and the operating lamp.

The circuit maintains the 377 V rms across transformer $T_1$ and the current through the lamp is determined by the capacitive reactance of $C_3$ and the lamp impedance. The lamp impedance $R_L$ is almost entirely resistive at the frequencies of operation considered, hence the voltage across $C_3$($V_{C3}$) and the lamp voltage ($V_L$) can be determined from the vector diagram shown in FIG. 5. The current that will flow through the lamp can then be calculated to be approximately:

$$I_L = V_{C3} 2\pi f C_3$$

Thus by selection of the capacitance of $C_3$, the desired lamp current can be achieved. In practice, the voltage drop across $C_3$ is much larger than the voltage drop across the lamp and good ballast stabilization of lamp current is achieved.

When the apparatus is initially energized, the frequency of oscillations is determined by the inductance of the transformer primary $T_p$ and the capacitance of the tuned circuit capacitor $C_2$ and a typical initial "lamp starting" resonant frequency is approximately 77 kHz. After the lamp strikes, the resonant frequency of operation is determined by the inductance of the transformer primary ($L_p$) and the capacitance of $C_2$ and $C_3$ such that:

$$f = \frac{1}{2\pi \sqrt{L_p(C_2 + C_3)}} \text{ Hz}$$

For the present particular application, the operating frequency can be calculated as approximately 50 kHz which provides a good compromise between transistor switching losses and component sizes.

FIGS. 6A through 6E show the voltage-current timing relationships that occur at various parts of the foregoing apparatus. The circuit operates in Class D and it will be observed that the voltages at the collectors of the transistors are minimum (in saturation) when the collector currents are flowing and hence, minimum dissipation occurs in the transistors. The voltage drops across $Q_1$ and $Q_2$ are indicated as $V_{Q1}$ and $V_{Q2}$ in FIG. 3 and FIGS. 6A and 6C and typically have a peak value of 534 V. The currents through $Q_1$ and $Q_2$ are indicated as $I_{Q1}$ and $I_{Q2}$ in FIG. 3 and FIGS. 6B and 6D and typically have a value of 160 mA for a lamp operated with a light output of 1500 lumens. The voltage across $L_1$ is indicated as $V_{L1}$ in FIG. 3 and FIG. 6E and typically has a peak value of 267 V.

Figure 6:
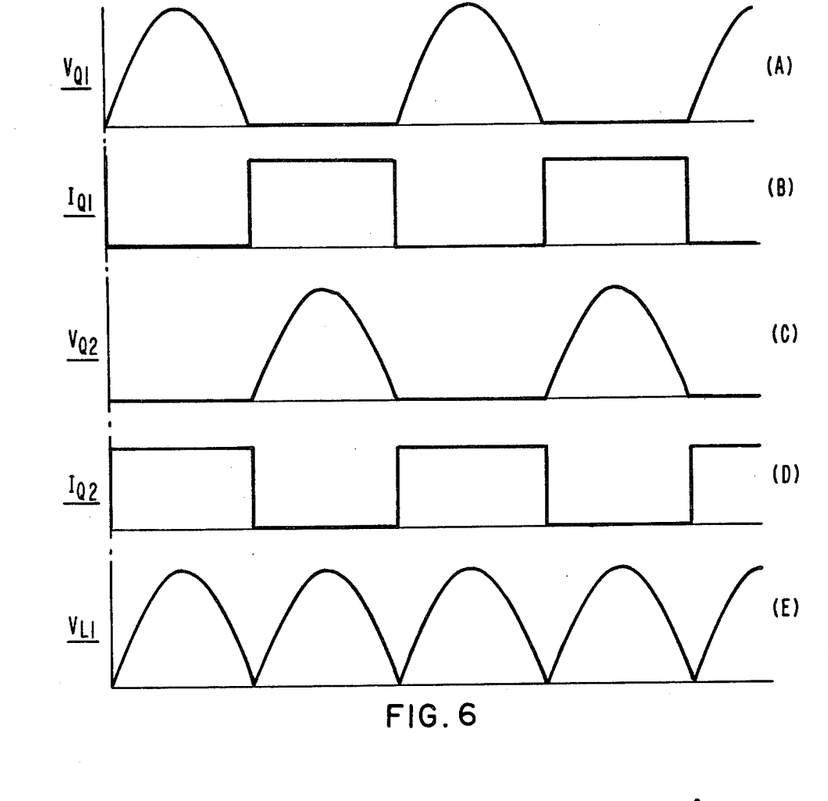
FIGS. 6A through 6E illustrate voltage and current waveform which are present in various portions of the circuit as shown in FIG. 3.

Inductor $L_1$ provides a direct current path and also acts as a high impedance choke at the operating frequency of the circuit. Due to the push-pull nature of the conduction of the transistors, the voltage across $L_1$ looks like a full wave voltage rectification at the operating frequency, as shown in FIG. 6(E) which does not contain the fundamental component of the frequency. Thus the junction of $L_1$ and the midpoint 56 the primary of $T_p$ is a null point at the operating frequency.

Following is a component chart for the various elements which comprise the apparatus 40.

| COMPONENT CHART | |
| --- | --- |
| Component | Description |
| Bridge 48 | 4 × 1N 4003 |
| $R_1$ | 5Ω (8W) |
| $R_2$ | 47KΩ (1W) |
| $R_3$ | 10Ω (0.25W) |
| $C_1$ | 47 μF (200 V DC) |
| $C_2$ | 2400 pF |
| $C_3$ | 0.0033 μF |
| $D_1$ | 1N 4001 |
| $Q_1, Q_2$ | MJE 13003 (Motorola) |
| $T_1$ | Ferrite core |
| $T_p$ (inductance) | 1.8 mH |
| $T_s$ (peak voltage) | 10 volts |
| $L_1$ | 2.2 mH |
| $L_2$ | 6.8 mH |

For operating a lamp as described hereinbefore with a light output of 1500 lumens, the power input to the system is approximately 27 watts so that the system efficacy is approximately 55 lumens per watt. The circuit is approximately 90% efficient so that under these conditions of operation, the wattage losses in the circuit are approximately 2.7 watts. The system operates with a power factor of approximately 0.6. By modifying the capacitance of $C_3$, the power input to the lamp can be increased or decreased. Lamps as described hereinbefore which have a total tube length of 16 inches (40.6 cm) and a tube outer diameter of 0.75 inch (1.9 cm) have been operated with a lamp current as high as 0.75 A rms which will provide a total light output of approximately 2,000 lumens, with a system efficacy of approximately 55 lumens per watt. When the value of $C_3$ is so selected that the lamp provides an output of approximately 1,500 lumens, the lamp current is approximately 0.45 A rms. Thus this provides almost as much light output as a standard 100 watt incandescent lamp, but with a system power input of only 27 watts and a greatly extended life.

The foregoing apparatus is readily adapted to provide different power levels of operation for the lamp 10. Referring to the embodiment shown in FIG. 7, the current limiting capacitor $C_3$ has substituted therefor two capacitors each having one-half the value of capacitance of the capacitor $C_3$. One of these capacitors designated $aC_3/2$ connects directly in series with the lamp 10 to be operated and the other capacitor $bC_3/2$ is connected in series with a two position switch 74. In one switch position 76, the two capacitors $aC_3/2$ and $bC_3/2$ are connected in parallel and in series with the lamp 10 as operated. In the other switch position 78, the capacitor $bC_3/2$ will be connected in parallel with the capacitor $C_2$ and in parallel with the series-connected capacitor $aC_3/2$ and the operating lamp 10. Thus in the one switch position 76, the value of the current limiting capacitive reactance will be twice the value of the corresponding reactance when the switch is in the other position 78. The resulting lamp brightness can thus be set for one of two predetermined values, one of which is twice the other. Equally important, however, whichever position the switch 74 occupies, the total capacitive reactance in the tuned circuit will always remain the same so that the circuit operation is not altered by varying the brightness of the lamp. The resonant frequency during starting will be modified somewhat, depending upon the position of the switch 74, but this is a very transient condition and does not affect the lamp operation.

Figure 8:
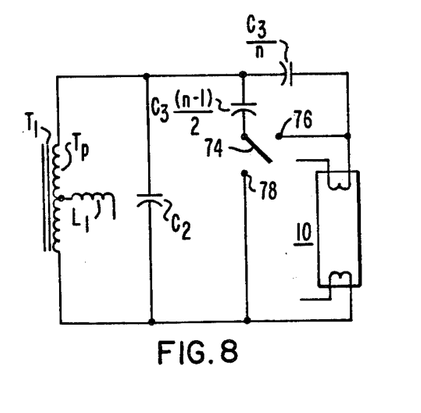
FIG. 8 corresponds to FIG. 7 but illustrates another alternative embodiment wherein relative operating lamp brightness values can be readily predetermined.

In the embodiment as shown in FIG. 8, the respective values of the current limiting capacitance and the additional capacitor can be predetermined to provide any predetermined ratio of lamp brightness levels. For example, if it is desired to vary the lamp brightness by a factor of 5, where $n=5$, the current limiting capacitor $C_3/n$ is provided with a capacitance of one-fourth that of the capacitor $C_3(n-1)/n$. The lamp unit 26 as shown in FIG. 2 can be readily modified to incorporate the additional switch 74 by locating it at the exterior edge of the platform 28, for example. The user can then select that level of light which is desired.

While the foregoing description has considered the operation of a lamp having an overall length of 16 inches (40.6 cm), fluorescent lamps of other designs and configurations can also be operated from such an apparatus. As a general rule, the longer the lamp envelope, the higher the system efficacy which can be achieved.

Figure 9:
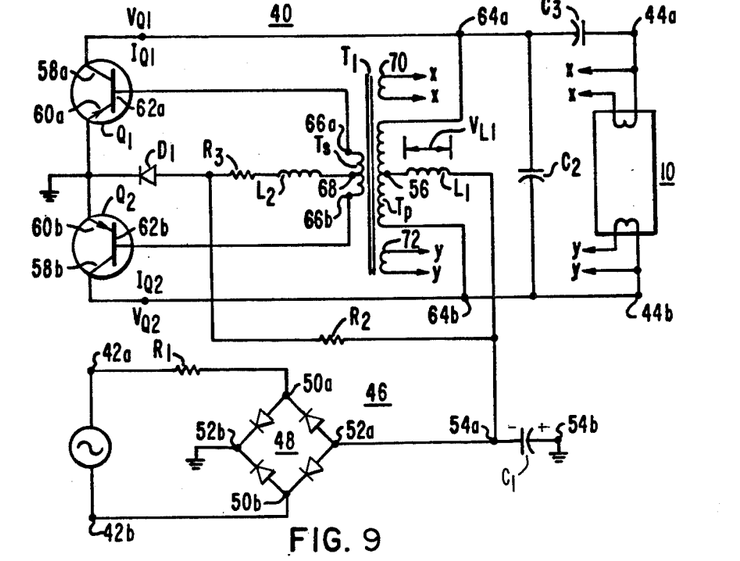
FIG. 9 is a circuit diagram of an alternative embodiment of the circuit as shown in FIG. 3, wherein PNP transistors are used to replace the NPN transistors.

The circuit as diagrammed in FIG. 3 can be modified by the substitution of PNP transistors for the NPN transistors, as shown in FIG. 9, with the polarity of the diodes being reversed. Other than this, the two circuits are identical. Thus, the transformer $T_1$ is connected at the midpoint of the primary winding $T_p$ via the choke $L_1$ to one output terminal of the AC to DC conversion means 48. The transistors remain connected in push-pull arrangement between the ends of the transformer primary winding $T_p$ and the other output terminal of the AC to DC conversion means 48.

Figure 10:
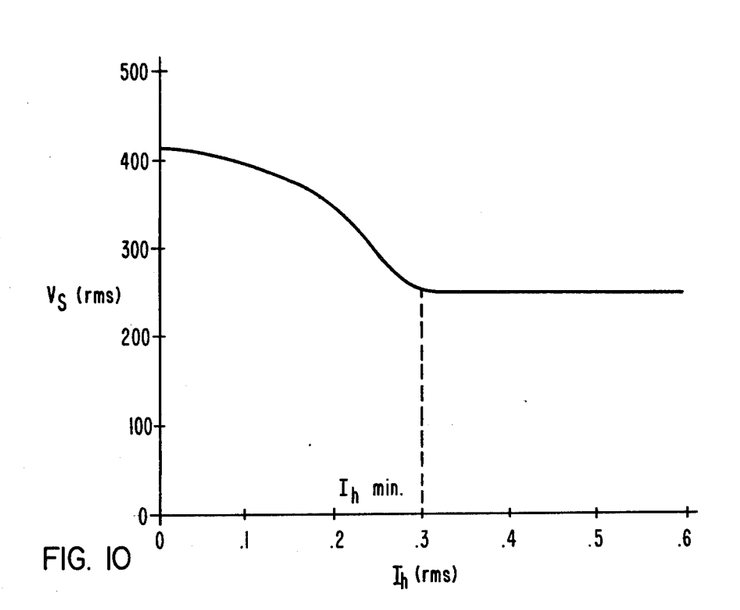
FIG. 10 is a graph of lamp starting voltage vs. lamp heater voltage for a particular lamp.

In FIG. 10 is shown a graph of lamp starting voltage $V_s$ (rms) vs. lamp electrode heater current $I_h$ (rms) for the particular compact fluorescent lamp as described hereinbefore. As shown, for this particular lamp once a lamp electrode heater current of 0.3 amp is exceeded, the starting voltage requirement essentially remains independent of heater current. After the lamp has started, the heater currents can be decreased or even reduced to zero with negligible effect on the lamp operation. Furthermore, actuation of only one heater is required for effective starting and will result in a starting voltage requirement which is not significantly different from that of a lamp which has two electrode heaters activated, provided the minimum electrode heating current is exceeded.

Figure 11:
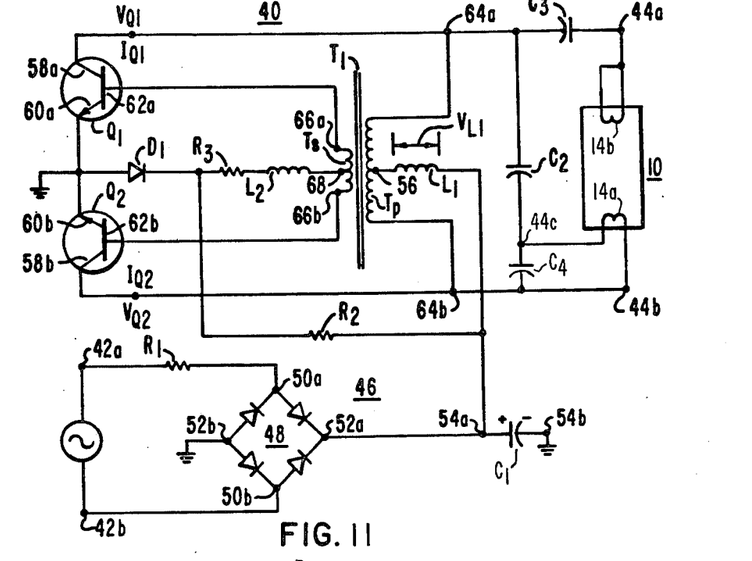
FIG. 11 is an alternative circuit diagram wherein only one lamp electrode is heated during lamp starting and operation.

In FIG. 11 is shown an alternative circuit embodiment wherein only one lamp electrode 14a is heated. As previously described, the voltage developed across $T_1$ is approximately constant at 377 V rms both during startup and operation of the lamp. Once the lamp starts, as previously described, the operating frequency is approximately 50 kHz and before the lamp strikes, the resonant frequency for this embodiment can be calculated as:

$$\text{Freq. (starting)} = \text{Freq. (operating)} \sqrt{\frac{C_2 + C_3}{C_1}} = 77 \text{ kHz}$$

Thus, before the lamp strikes, the current through $C_2$, and hence the current through the electrode coil or heater 14a is calculated by the voltage across the transformer primary $T_p$ divided by the reactance of capacitor $C_2$. This is equal to $377 \times 2\pi f_s C_1$ which equals 0.34 ampere. For this particular lamp, this is greater than the minimum heater current required, as shown in FIG. 10, and start-up is achieved. When the lamp starts, the operating frequency drops to 50 kHz and the current through $C_2$ and thus through the heater is reduced to $V_c 2\pi f_r C_2$ which can be calculated as 0.19 ampere. This reduction in heater current results in a reduction of heater power and hence improves the system efficacy. Furthermore, since only one lamp electrode 14a is heated, the power saved due to non-activation of the second electrode 14b also results in improved system efficacy.

Considering the actual arrangement of the circuit as shown in FIG. 11, it is quite similar to the circuit as shown in FIG. 3 except that the transformer electrode heater coils 70 and 72 are eliminated, and the ends of the uppermost electrode 14b are tied together. The electrode 14a which is heated is connected in electrical circuit intermediate one end 64b of the transformer primary winding $T_p$ and the tuned circuit capacitor $C_2$, in order to effect electrode preheating. For such an arrangement, an additional capacitor $C_4$ is desirably connected across the heated electrode 14a in order to short circuit high-voltage pulses which may occur if the electrode 14a has an open circuit, in order to prevent damage to the transistors. The additional capacitor $C_4$ can typically have a value of 0.02 microfarad so that it essentially has no affect on the operation of the circuit. Summarizing the operation of the embodiment shown in FIG. 11, the tuned circuit capacitor means $C_2$ is connected in series with the lamp electrode 14a when the lamp 10 is connected in circuit across the output terminals 44a, 44b, 44c of the apparatus. The series-connected tuned circuit capacitor means $C_2$ and the lamp electrode 14a are thus connected across the ends 64a, 64b of the transformer primary winding $T_p$ to form therewith a first resonant tuned circuit when the lamp is not operating, which as previously described has a resonant frequency of approximately 90 kHz. A current limiting capacitor means $C_3$ is connected in series with the lamp 10 as connected in circuit, with the series-connected lamp and the current limiting capacitor means $C_3$ connected in parallel with the tuned circuit capacitor means $C_2$. The current limiting capacitor means $C_3$ and the tuned circuit capacitor means $C_2$ form with the transformer means primary winding $T_p$ a second tuned circuit when the lamp is connected in circuit and is operating, with the frequency of the second tuned circuit being approximately 50 kHz. The other identified elements of the circuit of FIG. 11 are as shown in FIG. 3 and described hereinbefore.

Figure 12:
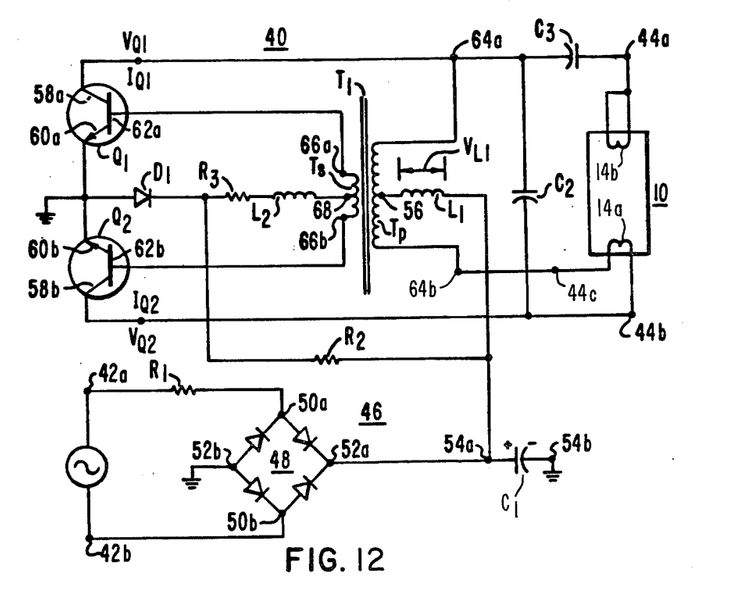
FIG. 12 is another alternative circuit diagram wherein only one lamp electrode is heated during lamp starting and operation.

In FIG. 12 is shown yet another alternative circuit wherein only one of the electrodes 14a of the lamp 10 is adapted to be preheated to facilitate starting. When the lamp is connected in circuit to the apparatus output terminals 44a, 44b and 44c, the electrode 14a is connected in electrical circuit intermediate one of the transistors $Q_2$ and one end 64b of the transformer means primary winding $T_p$ in order to effect electrode preheating. In this embodiment, the current through the electrode before the lamp starts can be calculated as $V_c/X_{Lp}$ which is equal to $377/2\pi f_s L_p$ and during running, the heater current can be calculated as $V_c/2\pi f_R L_p$. For this particular case where $L_p = 1.8$ mH, the heater current can be calculated as 0.43 ampere, which is greater than the minimum heater current required to facilitate starting and the operating heater current can be calculated as 0.667 ampere.

Considering the operation of the circuit shown in FIG. 12 in greater detail, the transformer primary winding $T_p$ and the lamp electrode 14a are connected in series when the lamp is connected across the apparatus output terminals. The tuned circuit capacitor means $C_2$ is connected in parallel with the series-connected transformer primary $T_p$ and the lamp electrode 14a in order to form a first resonant tuned circuit when the lamp 10 is not operating.

As in the previous embodiment, a current limiting capacitor $C_3$ connects in series with the lamp 10 as connected in circuit and the series-connected lamp 10 and the current limiting capacitor $C_3$ connect in parallel with the tuned circuit capacitor $C_2$. The current limiting capacitor $C_3$ and the tuned circuit capacitor $C_2$ form with the transformer primary $T_p$ a second tuned circuit when the lamp 10 is actually operating. The other identified elements of the circuit of FIG. 12 are as shown in FIG. 3 and described hereinbefore.

Figure 7:
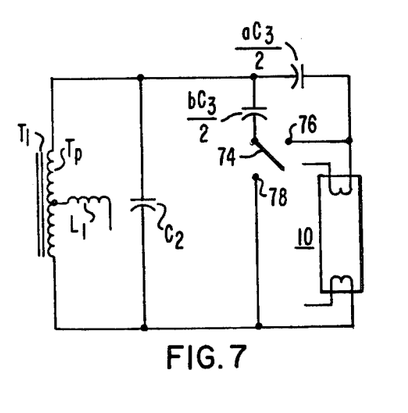
FIG. 7 is a diagram of a portion of the circuit shown in FIG. 3, but showing an alternative embodiment whereby the brightness level of the operating lamp can be adjusted.

In any of the circuit embodiments as described, the PNP transistors can be substituted for the NPN transistors. Also, any of the foregoing embodiments can be modified to provide a predetermined degree of dimming in the manner as described for the circuits as shown in FIGS. 7 and 8.

I claim:

1. A starting and operating apparatus for a fluorescent lamp having one electrode adapted to be preheated to facilitate lamp starting comprising:

apparatus input terminals adapted to be connected across a source of AC energizing potential, and apparatus output terminals across which the lamp to be operated is adapted to be connected in circuit;

AC to DC conversion means having input terminals and output terminals, said conversion means input terminals connected to said apparatus input terminals and said conversion means operable to convert said AC potential to predetermined DC potential which is developed across said conversion means output terminals;

transformer means having a primary winding of predetermined inductance and a secondary winding, said transformer means primary winding connected at its mid-point via a choke to one output terminal of said conversion means, tuned circuit capacitor means of predetermined capacitance connected across said transformer means primary winding to form therewith a first resonant tuned circuit when said lamp is connected in circuit but is not operating, a current-limiting capacitor means connected in series with said lamp as connected in circuit, said series-connected lamp and current-limiting capacitor means being connected in parallel with said tuned circuit capacitor means, and said current-limiting capacitor means and said tuned circuit capacitor means forming with said transformer means primary winding a second tuned circuit when said lamp is connected in circuit and is operating;

a pair of transistors connected in push-pull arrangement in circuit between the ends of said transformer means primary winding and the other output terminal of said conversion means, the base electrodes of said transistors being connected across said transformer means secondary winding so that the push-pull connected transistors oscillate at the tuned circuit resonant frequency as determined by the inductance of said transformer means primary winding and the total capacitance of said connected capacitor means, and means for applying a potential from said one output terminal of said conversion means to the midpoint of said transformer means secondary winding to initiate transistor conduction upon energization of said apparatus, and when said lamp is connected to said apparatus output terminals, said preheatable electrode is connected in electrical circuit intermediate one end of said transformer means primary winding and said tuned circuit capacitor means so as to effect electrode preheating.

2. The apparatus as specified in claim 1, wherein the collectors of said transistors are connected to the ends of said transformer means primary winding, the AC to DC conversion means include a storage capacitor coupled to its output terminals and the emitters of said transistors are connected to the more-negative terminal of said storage capacitor, and the base electrodes of said transistors connect to the ends of said transformer means secondary winding, means connecting the midpoint of said secondary winding to the more-negative terminal of said storage capacitor via means for blocking direct current flow from said transformer means secondary winding toward said more-negative terminal of said storage-capacitor and wherein said potential applying means connects the midpoint of said secondary winding to the more-positive terminal of said storage capacitor through a resistor to provide a positive potential to initiate said transistor conduction.

3. The apparatus as specified in claim 2, wherein said means for blocking direct current flow is a blocking diode, and further comprising a resistor of predetermined value and an inductor of predetermined value connected in series between the cathode of said blocking diode and the midpoint connection of said transformer means secondary winding to optimize the switching current delivered to the said bases of said transistor means.

4. A starting and operating apparatus for a fluorescent lamp comprising:

apparatus input terminals adapted to be connected across a low frequency source of AC energizing potential, and apparatus output terminals across which the lamp to be operated is adapted to be connected in circuit;

AC to DC conversion means having input terminals and output terminals, said conversion means input terminals connected to said apparatus input terminals and said conversion means operable to convert said AC potential to a predetermined DC potential which is developed across said conversion means output terminals;

transformer means having a primary winding of predetermined inductance and a secondary winding, said transformer means primary winding connected at its midpoint via a choke to one output terminal of said conversion means, tuned circuit capacitor means of predetermined capacitance connected in series with one of said lamp electrodes when said lamp is connected in circuit, said series-connected tuned circuit capacitor means and said one lamp electrode being connected across first and second ends of said transformer primary winding to form therewith a first resonant tuned circuit when said lamp is not operating, a current-limiting capacitor means connected in series with said lamp as connected in circuit, said series-connected lamp and current-limiting capacitor means being connected in parallel with said tuned circuit capacitor means, and said current-limiting capacitor means and said tuned circuit capacitor means forming with said transformer means primary winding a second tuned circuit when said lamp is connected in circuit and is operating; and a pair of first and second transistors connected in push-pull arrangement in circuit between the ends of each transformer means primary winding and the other output terminal of said conversion means when said lamp is connected in circuit, said transistors each having an output electrode, and means directly connecting the output electrodes of the first and second transistors to said first and second ends of the transformer primary winding, respectively, means connecting the base electrodes of said transistors across said transformer means secondary winding so that the push-pull connected transistors oscillate at the tuned circuit resonant frequency as determined by the inductance of said transformer means primary winding and the total capacitance of said connected capacitor means, and means for applying a potential from said one output terminal of said conversion means to the midpoint of said transformer means secondary winding to initiate transistor conduction upon energization of said apparatus.

5. A starting and operating apparatus for a fluorescent lamp comprising:

apparatus input terminals adapted to be connected across a source of AC energizing potential, and apparatus output terminals across which the lamp to be operated is adapted to be connected in circuit;

AC to DC conversion means having input terminals and output terminals, said conversion means input terminals connected to said apparatus input terminals and said conversion means operable to convert said AC potential to a predetermined DC potential which is developed across said conversion means output terminals;

transformer means having a primary winding of predetermined inductance and a secondary winding, said transformer means primary winding being connected at its mid-point via a choke to one output terminal of said conversion means, tuned circuit capacitor means of predetermined capacitance connected across said transformer means primary winding to form therewith a first resonant tuned circuit when said lamp is connected in circuit but is not operating, a current-limiting capacitor means connected in series with said lamp as connected in circuit, said series-connected lamp and current-limiting capacitor means being connected in parallel with said tuned circuit capacitor means, and said current-limiting capacitor means and said tuned circuit capacitor means forming with said transformer means primary winding a second tuned circuit when said lamp is connected in circuit and is operating;

a pair of transistors connected in push-pull arrangement in circuit between the ends of said transformer means primary winding and the other output terminal of said conversion means, the base electrodes of said transistors being connected across said transformer means secondary winding so that the push-pull connected transistors oscillate at the tuned circuit resonant resonant frequency as determined by the inductance of said transformer means primary winding and the total capacitance of said connected capacitor means, and means for applying a potential from said one output terminal of said conversion means to the midpoint of said transformer means secondary winding to initiate transistor conduction upon energization of said apparatus, and additional capacitor means of predetermined capacitance and two-position switching means connected in series circuit, in one position of said two-position switching means said additional capacitor means being connected in parallel with said tuned resonant circuit capacitor means, and in the other position of said two-position switching means said additional capacitor means being connected in parallel with said current-limiting capacitor means, whereby the total value of capacitance in the resonant circuit during lamp operation remains the same in both switch positions, but the brightness of the operating lamp is varied in accordance with the value of current-limiting capacitance which is in series circuit therewith.

6. A starting and operating apparatus for a fluorescent lamp comprising:

a pair of apparatus input terminals adapted to be connected across a source of AC energizing potential, and a pair of apparatus output terminals across which the lamp to be operated is adapted to be connected;

AC to DC conversion means having input terminals and output terminals, said conversion means input terminals connected to said apparatus input terminals and said conversion means operable to convert said AC potential to a predetermined DC potential which is developed across said conversion means output terminals;

a transformer having a primary winding of predetermined inductance and a secondary winding, means connecting a tap point on said transformer primary winding to the more-positive output terminal of said conversion means via an inductor, a capacitor means of predetermined capacitance connected across said transformer primary winding to form therewith a first resonant tuned circuit, a current-limiting capacitor means connected in series with said apparatus output terminals, means coupling said series-connected current-limiting capacitor means and said apparatus output terminals across said transformer primary winding so that when an operating lamp is connected across said apparatus output terminals, said current-limiting capacitor means and said capacitor means form with said transformer primary winding a second tuned resonant circuit;

a pair of transistors connected in push-pull arrangement and coupled in circuit between said transformer primary winding and the other output terminal of said conversion means, means connecting the base electrodes of said transistors across said transformer secondary winding so that the push-pull connected transistors oscillate at the tuned circuit resonant frequency as determined by the inductance of said transformer primary winding and the total capacitance of said connected capacitor means, and means for applying a potential from said one output terminal of said conversion means to the midpoint of said transformer secondary winding to initiate transistor conduction upon energization of said apparatus, and a switch, and wherein said current-limiting capacitor means comprises a first capacitor connected in series with the lamp and a second capacitor, said switch being connected in circuit so as to selectively connect said second capacitor in parallel with said capacitor means or in parallel with said first capacitor thereby to vary the light output of an operating lamp while maintaining the total capacitance in the resonant circuit approximately constant during lamp operation.

7. A starting and operating apparatus for a fluorescent lamp comprising:

a pair of apparatus input terminals adapted to be connected across a source of AC energizing potential, and a pair of apparatus output terminals across which the lamp to be operated is adapted to be connected;

AC to DC conversion means having input terminals and output terminals, said conversion means input terminals connected to said apparatus input terminals and said conversion means operable to convert said AC potential to a predetermined DC potential which is developed across said conversion means output terminals;

a transformer having a primary winding of predetermined inductance and a secondary winding, means connecting a tap point on said transformer primary winding to the more-positive output terminal of said conversion means via an inductor, a capacitor means of predetermined capacitance connected across said transformer primary winding to form therewith a first resonant tuned circuit, a current-limiting capacitor means connected in series with said apparatus output terminals, means coupling said series-connected current-limiting capacitor means and said apparatus output terminals across said transformer primary winding so that when an operating lamp is connected across said apparatus output terminals, said current-limiting capacitor means and said capacitor means form with said transformer primary winding a second tuned resonant circuit;

a pair of transistors connected in push-pull arrangement and coupled in circuit between said transformer primary winding and the other output terminal of said conversion means, means connecting the base electrodes of said transistors across said transformer secondary winding so that the push-pull connected transistors oscillate at the tuned circuit resonant frequency as determined by the inductance of said transformer primary winding and the total capacitance of said connected capacitor means, and means for applying a potential from said one output terminal of said conversion means to the midpoint of said transformer secondary winding to initiate transistor conduction upon energization of said apparatus, wherein the lamp includes at least one electrode adapted to be preheated to facilitate lamp starting so that when said lamp is connected to said apparatus output terminals, said preheatable electrode is connected in series with said capacitor means across said primary winding thereby to effect electrode preheating.

* * * * *

UNITED STATES PATENT AND TRADEMARK OFFICE
CERTIFICATE OF CORRECTION

PATENT NO. : 4,463,286

DATED : July 31, 1984

INVENTOR(S) : JAMES W.H. JUSTICE

It is certified that error appears in the above-identified patent and that said Letters Patent is hereby corrected as shown below:

Column 1, line 18, change "are" to --as--

In the Claims:

Claim 1, line 2, change "one" to --an--
        line 10, after "terminals" insert --being--
        line 17, after "winding" insert --being--

Claim 3, line 9, delete "transistor means" and insert --transistor--

Claim 4, line 10, after "terminals" insert --being--
        line 17, after "winding" insert --being--
        line 39, change "each" to --said--

Claim 5, line 9, after "terminals" insert --being--
        line 10, after "means" insert --being--
        line 40, delete "resonant" (first occurence)

UNITED STATES PATENT AND TRADEMARK OFFICE
CERTIFICATE OF CORRECTION

PATENT NO. : 4,463,286

DATED : July 31, 1984

INVENTOR(S) : JAMES W.H. JUSTICE

It is certified that error appears in the above-identified patent and that said Letters Patent is hereby corrected as shown below:

In the Claims:

Claim 6, line 10, after "terminals" insert --being--
        line 11, after "means" insert --being--

Claim 7, line 10, after "terminals" insert --being--
        line 11, after "means" insert --being--

Signed and Sealed this

Sixteenth Day of July 1985

[SEAL]

Attest:

DONALD J. QUIGG

Attesting Officer     Acting Commissioner of Patents and Trademarks